(12) United States Patent
Kim

(10) Patent No.: US 8,717,742 B2
(45) Date of Patent: May 6, 2014

(54) GAS INSULATED SWITCHGEAR WITH WITHDRAWABLE CIRCUIT BREAKER UNIT

(75) Inventor: Min Hyung Kim, Ulsan (KR)

(73) Assignee: Hyundai Heavy Industries Co., Ltd., Ulsan (KR)

( * ) Notice: Subject to any disclaimer, the term of this patent is extended or adjusted under 35 U.S.C. 154(b) by 0 days.

(21) Appl. No.: 13/600,807

(22) Filed: Aug. 31, 2012

(65) Prior Publication Data

US 2013/0170104 A1    Jul. 4, 2013

(30) Foreign Application Priority Data

Aug. 31, 2011    (KR) ........................ 10-2011-0087590

(51) Int. Cl.
*H02B 1/20*      (2006.01)
*H02B 13/035*    (2006.01)

(52) U.S. Cl.
USPC ............................. 361/612; 361/618; 361/620

(58) Field of Classification Search
USPC .................. 361/604, 606, 608, 612, 618–619
See application file for complete search history.

(56) References Cited

U.S. PATENT DOCUMENTS

| | | | | |
|---|---|---|---|---|
| 3,654,409 | A | * | 4/1972 | Kessler ........................ 200/48 R |
| 4,241,379 | A | * | 12/1980 | Olsen ............................ 361/618 |
| 4,360,857 | A | | 11/1982 | Olashaw |
| 6,175,486 | B1 | * | 1/2001 | Ponsioen ...................... 361/605 |
| 6,518,531 | B2 | * | 2/2003 | Arioka et al. ................. 218/154 |
| 7,193,172 | B2 | * | 3/2007 | Rokunohe et al. ............. 218/43 |
| 8,462,486 | B2 | * | 6/2013 | Fink et al. ..................... 361/612 |
| 2002/0043911 | A1 | | 4/2002 | Froberg |
| 2011/0261506 | A1 | * | 10/2011 | Narin et al. .................... 361/611 |
| 2012/0008256 | A1 | * | 1/2012 | Abrahamsen et al. ........ 361/611 |
| 2013/0050905 | A1 | * | 2/2013 | Kim ............................. 361/608 |

FOREIGN PATENT DOCUMENTS

| | | | | | |
|---|---|---|---|---|---|
| EP | 2195896 | A2 | | 6/2010 | |
| JP | 03273804 | A | * | 12/1991 | ............. H02B 13/02 |
| JP | 11155209 | A | * | 6/1999 | ............. H02B 13/02 |
| JP | 2007104753 | A | * | 4/2007 | ............. H02B 13/02 |
| JP | 2009081910 | A | * | 4/2009 | ............... H02B 1/28 |
| KR | 10-2007-0102376 | A | | 10/2007 | |
| KR | 100959521 | B1 | | 5/2010 | |
| KR | 10-2011-0007608 | | | 8/2011 | |
| WO | WO 9103089 | A1 | * | 3/1991 | .......... H02B 13/025 |
| WO | WO 0215352 | A1 | * | 2/2002 | .......... H02B 13/035 |

OTHER PUBLICATIONS

"ZX2 Gas-insulated medium voltage switchgear", ABB AG, Calor Emag Meduim Voltage Products, 2008, 16 pages.*

* cited by examiner

*Primary Examiner* — Robert J Hoffberg
(74) *Attorney, Agent, or Firm* — Sherr & Jiang, PLLC

(57) ABSTRACT

A GIS (Gas Insulated Switchgear) includes a main bus compartment including a main bus-bar unit, a transfer bus compartment including a transfer bus-bar unit, a sealed circuit breaker compartment including a circuit breaker unit and a load side compartment including a current transforming unit and a transfer bus conductor electrically coupling the transfer bus-bar unit and the current transformer unit. The circuit breaker unit is contained in the sealed circuit breaker compartment being separately independent from other compartments. The transfer bus conductor passes from the transfer bus-bar unit through the load side compartment to the current transformer unit without passing through the circuit breaker compartment. The sealed circuit breaker compartment and the load side compartment do not share insulating gas.

8 Claims, 3 Drawing Sheets

GAS INSULATED SWITCHGEAR WITH WITHDRAWABLE CIRCUIT BREAKER UNIT

CROSS-REFERENCE TO RELATED APPLICATIONS

This application claims foreign priority under 35 U.S.C. §119 to Korean Patent Application No. 10-2011-0087590 filed Aug. 31, 2011 with the Korean Intellectual Property Office, which is hereby incorporated by reference in its entirety.

FIELD OF THE INVENTION

This application relates to a GIS (Gas Insulated Switchgear).

BACKGROUND OF THE INVENTION

A Gas Insulated Switchgear (GIS) is used to control the supply of electrical power between a source, such as a transformer, and a load, such as a factory. A GIS is a distributing board that contains high or medium voltage electrical devices in a pressure-resistant tank filled with gas. In general, a GIS receives electrical power through a main bus and passes it through a circuit breaker unit, to a potential current transforming unit, a main bus-bar unit and to the load through cables. The circuit breaker monitors the supply and disconnects the main bus from the load if an abnormality is detected. A pair of switches is provided, one on either side of the circuit breaker to permit the circuit breaker to be isolated. To provide for continuity of power, a secondary feed is provided from a second or transfer bus. In one configuration, known as a transfer bus configuration, this bypasses the circuit breaker and supplies power directly to the current transformer. A switch is provided between the secondary bus and the current transformer so that supply from only one bus is permitted.

The power carrying components are located within a localized gas environment. This typically is SF6 gas which has excellent characteristics for insulating and arc extinction. These characteristics enable the components to be placed closer to one another than in an air insulated switch and therefore allow for substation miniaturization, improvement of safety and reliability, ease of operation and maintenance, and so on.

A conventional GIS contains the circuit breaker unit, a current transforming unit and a cable terminal in a single sealed container and shares insulating gas (i.e., SF6 gas). Therefore, if the circuit breaker of the conventional GIS requires service or inspection, it is necessary to interrupt the power supply and evacuate the insulating gas from the sealed container for maintenance or replacement of the circuit breaker unit. A related technology is disclosed in Korea patent No 10-0959521.

Where a continuity of power supply is provided, such as by a transfer bus, the switch and other components associated with the transfer bus may be designed to function safely as the circuit breaker is serviced. The absence of an insulating gas may therefore be compensated for by increased spacing of the components.

SUMMARY OF THE INVENTION

To address the above-discussed problems occurring in the prior art, and one aspect of this application is to provide a GIS (Gas Insulated Switchgear) with a circuit breaker unit that is contained in a separate independent sealed circuit breaker compartment and the components associated with the alternate supply are located in one or more separate sealed compartments. The alternate supply may then be functional during maintenance of the circuit breaker whilst the advantages of the gas insulating are retained for the alternate supply.

Another aspect of this application is to provide a withdrawable circuit breaker unit quickly enabling maintenance and replacement.

Still another aspect of this application is to detach a circuit breaker unit in an independent compartment so that time consumed in insulating gas replacement is shortened and an amount of insulating gas is saved.

In some embodiments, a GIS (Gas Insulated Switchgear) includes a main bus compartment including a main bus-bar unit, a transfer bus compartment including a transfer bus-bar unit, a sealed circuit breaker compartment including a circuit breaker unit and a load side compartment including a current transforming unit and a transfer bus conductor electrically coupling the transfer bus-bar unit and the current transformer unit. The circuit breaker unit is contained in the sealed circuit breaker compartment being separately independent from other compartments. The transfer bus conductor passes from the transfer bus-bar unit through the load side compartment to the current transformer unit without passing through the circuit breaker compartment. The sealed circuit breaker compartment and the load side compartment do not share insulating gas.

In one embodiment, the circuit breaker compartment may be located contiguous with the main bus compartment and said load side compartment is located contiguous with said transfer bus compartment. The load side compartment may extend to the opposite side of the circuit breaker compartment to the main bus compartment. The main bus unit may be connected to the circuit breaker by a conductor passing through an insulating bushing in a wall separating the main bus compartment and the circuit breaker compartment. The circuit breaker may be connected to a switch by a conductor passing through an insulating bushing in a wall separating the circuit breaker compartment from the load side compartment and the switch may be located in the load side compartment In one embodiment, the circuit breaker unit may be slidable into or out of the sealed circuit breaker compartment.

In one embodiment, when the circuit breaker unit is withdrawn, the GIS may apply an electric current from the transfer bus-bar unit to the current transforming unit and the cable terminal.

In one embodiment, the GIS may further include a gas duct between the main bus compartment and transfer bus compartment, the main bus compartment and the transfer bus compartment being arranged side by side. Hot gas due to arc generated within one of the main bus compartment, the transfer bus compartment and the sealed circuit breaker compartment, egresses through the gas duct.

Accordingly, the GIS described in this application has at least the advantages described below.

The GIS may contain a circuit breaker unit in a separately independent sealed circuit breaker compartment, and may maintain and replace the circuit breaker unit without interrupting power supply by means of a transfer bus-bar unit.

The GIS may quickly maintain and replace a circuit breaker compartment by withdrawing the circuit breaker unit in a sliding way.

The GIS may minimize a size of a gas tank (i.e. sealed circuit breaker compartment) for a circuit breaker compartment by separately configuring the gas tank and may shorten time and save an amount of gas by locally replacing the gas tank.

REFERENCE NUMERALS USED IN THE DRAWINGS

Figure 1:
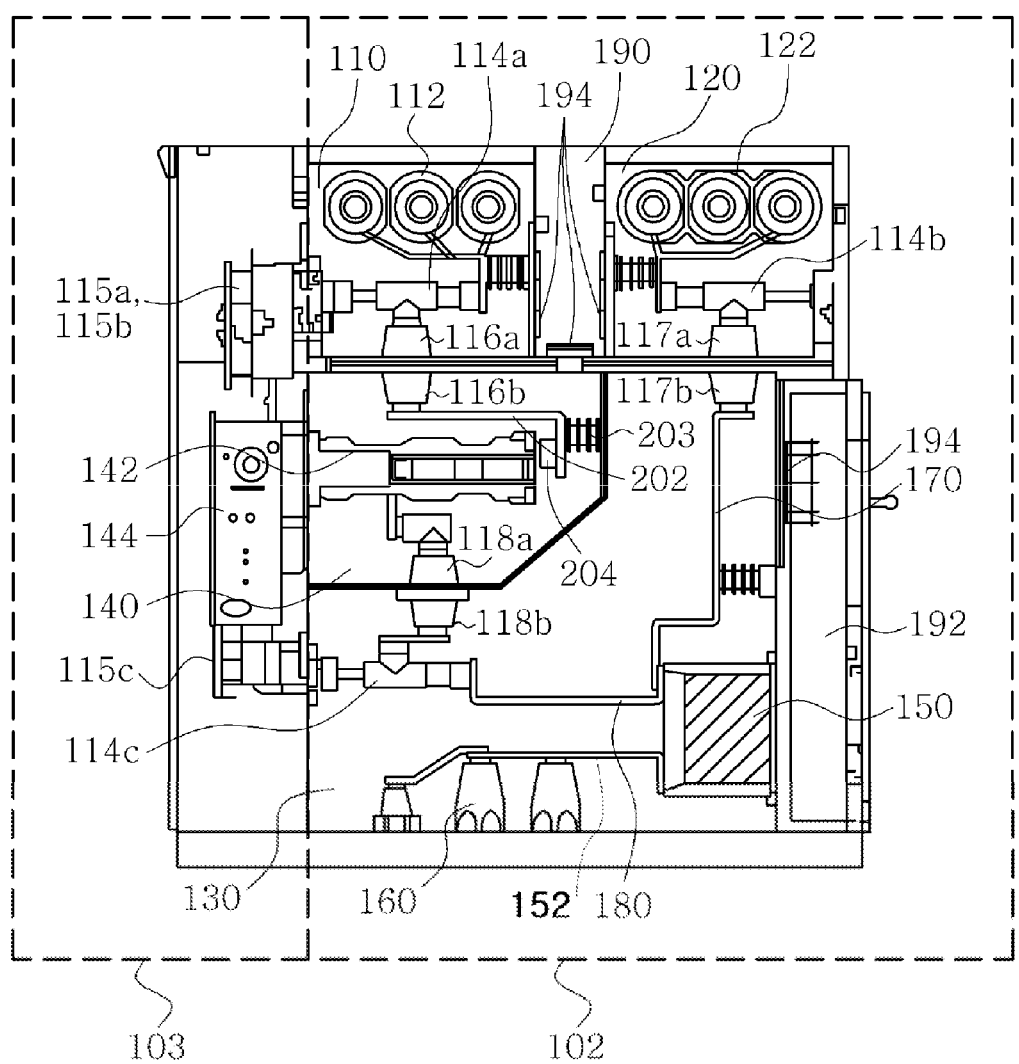
FIG. 1 is a side cross sectional diagram illustrating a GIS (Gas Insulated Switchgear) with a withdrawable circuit breaker unit according to an example embodiment of the described technology.

100: Gas Insulated Switchgear with a withdrawable circuit breaker
102: Housing
103: LV Compartment
110: Main Bus Compartment
112: Main Bus-bar Unit
114a: Switch Unit (May be referred to as Main Switch Unit)
114b: Switch Unit (May be referred to as Transfer Switch Unit)
114c: Switch Unit
115a: Motor Drive Unit for Switch Unit 114a
115b: Motor Drive Unit for Switch Unit 114b
115c: Motor Drive Unit for Switch Unit 114c
116a, 116b, 117a, 117b, 118a, 118b: Gas Tight Insulating Bush
120: Transfer Bus Compartment
122: Transfer Bus-bar Unit
130: Load Side Compartment
140: Sealed Circuit Breaker compartment
142: Circuit Breaker Unit
150: Current Transforming Unit
152: Conductor
160: Cable Terminal
170: Transfer Conducting Bus-bar
180: Main Conducting Bus-bar
190: First Gas Duct
192: Second Gas Duct
194: Burst Disc
200, 201: Male (or Female) Sliding Terminal
202: Conducting Strap
204, 205: Female (or Male) Sliding Terminal
202: Conducting Strap
203: Insulating Post

DETAILED DESCRIPTION OF THE INVENTION

Embodiments of the described technology now will be described more fully with reference to the accompanying drawings, in which embodiments of this technology are shown. This technology may, however, be embodied in many different forms and should not be construed as limited to the embodiments set forth herein. Rather, these embodiments are provided so that this disclosure will be thorough and complete, and will fully convey the scope of this technology to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, this technology will be described in detail with reference to the accompanying drawings.

FIG. 1 is a side cross sectional diagram illustrating a GIS (Gas Insulated Switchgear) with a withdrawable circuit breaker unit according to an example embodiment of the described technology.

Figure 2:
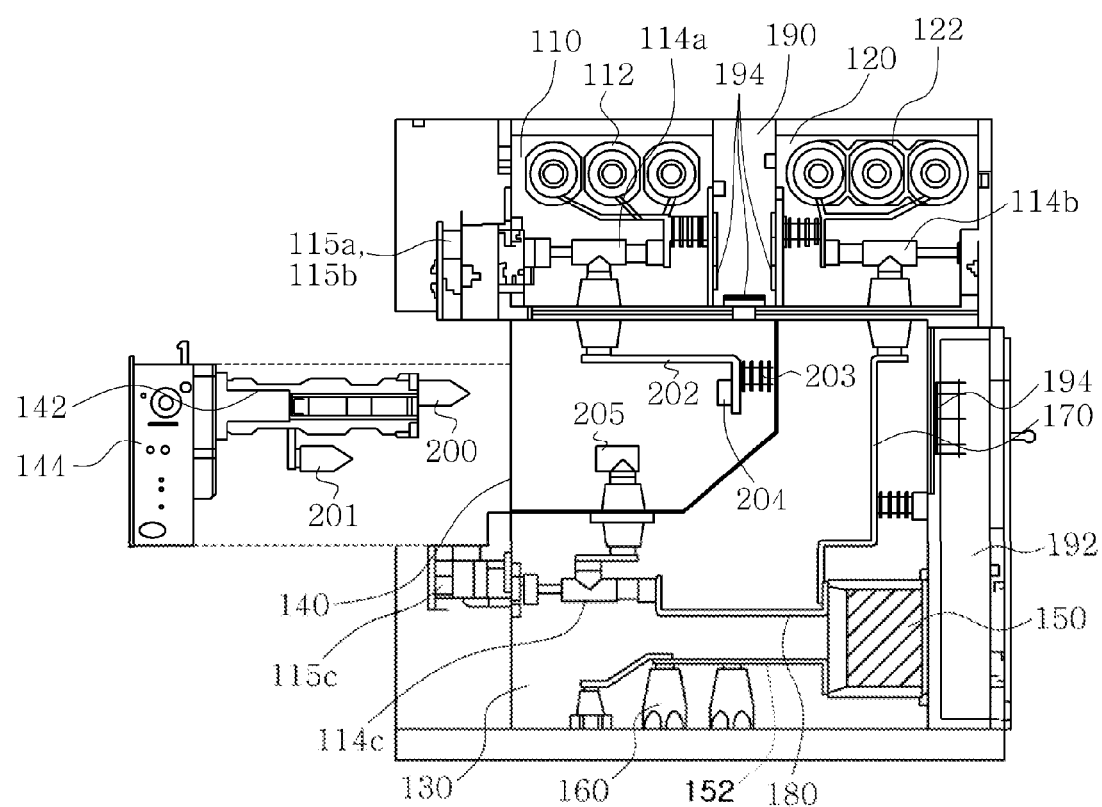
FIG. 2 is a side cross sectional diagram illustrating the GIS when the circuit breaker unit (CB) is withdrawn.
Figure 3:
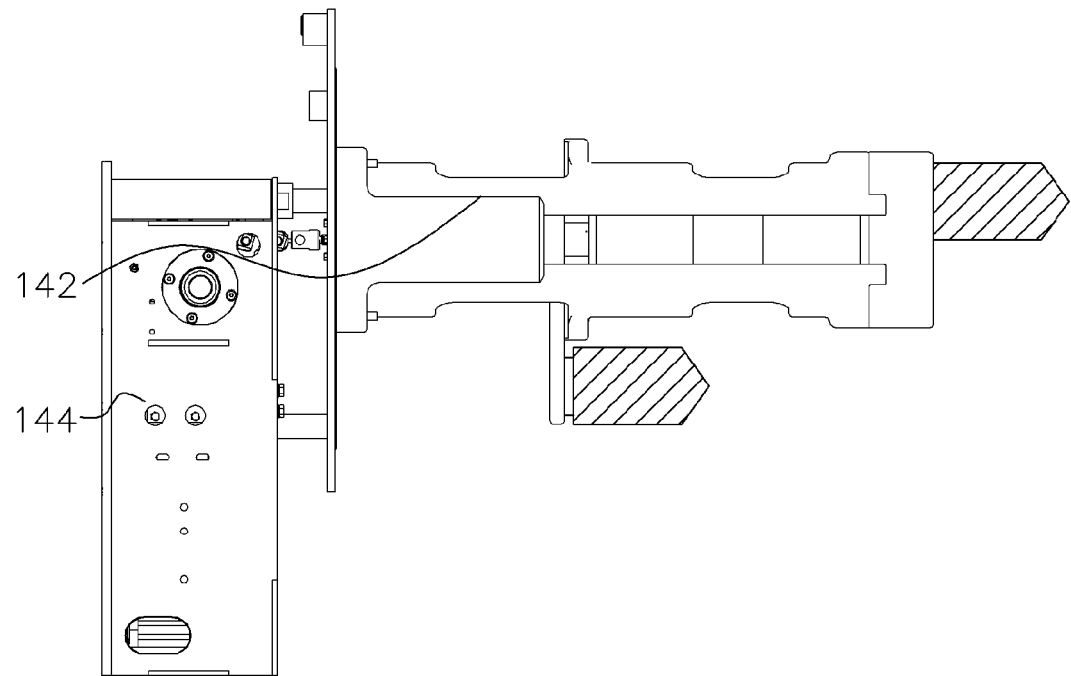
FIG. 3 is a side cross sectional diagram illustrating a CB.
Figure 4:
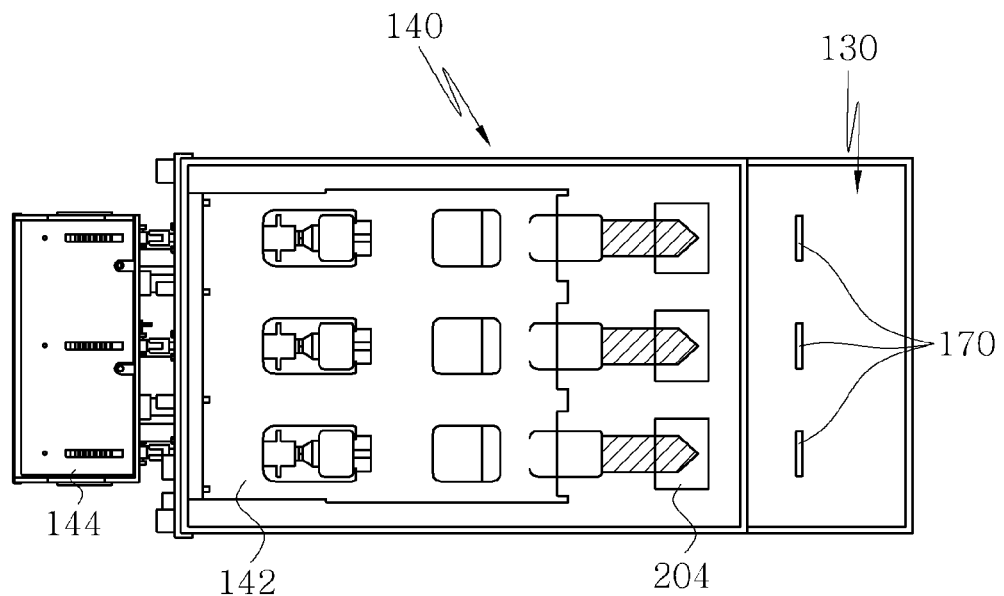
FIG. 4 is a top cross sectional diagram illustrating the arrangement of a three (3) phase CB in the housing of FIG. 1.

Referring to FIG. 1, a GIS 100 includes a housing 102 and low voltage (LV) compartment 103. A housing 102 contains a main bus compartment 110, a transfer bus compartment 120, a load side compartment 130, a sealed circuit breaker compartment 140, a first gas duct 190 and a second gas duct 192, and LV compartment 103 contains motor drive units for switch units 115a through 115c. The housing 102 and compartments 110, 120, 130 and 140 accommodate the components of switchgear associated with each of three phases, arranged side by side within the compartments as shown in FIG. 4. The components of one phase are shown in FIGS. 1 & 2, it being understood that the components of other phases are similar in arrangement.

The main bus compartment 110 is configured to be filled with insulating gas and contains a main bus-bar unit 112 providing a feed for each phase of the power supply and a switch unit 114a for each phase. The switch unit 114a is connected to a respective phase of the main bus-bar unit 112. The switch unit 114a is a conventional three-position switch which may be moved between closed (conducting), open (disconnecting) and grounded positions by a motor drive 115a. Proper grounding of the components is provided through the housing 102 and an earth strap, (not shown) to ensure. A gas tight insulating bush 116a is connected to the output from the switch unit 114a and joined to a gas tight insulating bush 116b in to the circuit breaker compartment 140. A conductor within the insulating bush 116a and 116b electrically connects the main bus compartment 110 and the circuit breaker compartment 140.

The transfer bus compartment 120 similarly is configured to be filled with insulating gas and contains a transfer bus-bar unit 122. A respective three-position of a switch unit 114b is connected with each phase of the transfer bus-bar unit 122. A gas tight insulating bush 117a is connected to the output of the switch unit 114b and joined to a gas tight insulating bush 116b which is connected to a transfer conducting bus 170 in the load side compartment 130. A conductor within the insulating bush 117a and 117b electrically connects the transfer bus compartment 120 and the load side compartment 140.

The load side compartment 130 is configured to be filled with insulating gas and contains a current transforming unit 150. The transfer conducting bus-bar 170 is connected to the current transformer 150 which is also connected to a main conducting bus-bar 180. The bus bar 180 is connected to the output of a three-position of a switch unit 114c, similar to the switch unit 114a, and can be electrically connected or disconnected by a motor drive 115c between a circuit breaker 142 and a current transforming unit 150. The switch unit 114c is supplied by a conductor within the insulating bush 118a and 118b from the circuit breaker compartment 140.

The output of the current transformer 150 is connected by a conductor 152 to a cable terminal 160 to which cables can be connected for supply of power to the load.

The circuit breaker unit 142 is contained in the sealed circuit breaker compartment 140 and is electrically connected between the switch unit 114a in the main bus compartment 110 and switch unit 114c in the load side compartment 130. It will be noted that the configuration of the circuit breaker compartment 140 allows a direct connection from the load side compartment 130 to the transfer bus compartment 120, thereby allowing the bus 170 to be contained wholly within the load side compartment 130.

The sealed circuit breaker compartment 140 is a separately independent compartment. The circuit breaker unit 142 is contained in the inner of the sealed circuit breaker compartment 140 and a circuit breaker driving unit 144 is attached in the outer of the sealed circuit breaker compartment 140.

As can be seen in FIG. 2, the circuit breaker 142 has a pair of sliding terminals 200 and 201. A conducting strap 202 is connected to the insulating bush 116b and extends rearwardly. The distal end of strap 202 is bent downwardly and is supported on an insulating post 203 secured to the rear wall of the circuit breaker compartment 140. A sliding terminal 204 is mounted on the end of the strap 202 to face forwardly in alignment with the terminal 200 on circuit breaker 142.

A sliding terminal 205 is connected to the insulating bush 118a and faces forwardly in alignment with the terminal 201 on the circuit breaker 142. The orientation of the terminals 200, 201, 204 and 205 allow the circuit breaker to be inserted or removed by movement along a single axis.

After each of the switch units 114a and 114c is grounded, the circuit breaker unit 142 may be withdrawn from the sealed circuit breaker compartment 140 by releasing the fastenings securing the circuit breaker unit 142 in a gas tight manner to the housing 102 and moving the unit along the axis. This movement disengages the sliding terminals so that when the circuit breaker unit 142 is withdrawn from the sealed circuit breaker compartment 140, the circuit breaker unit 142 electrically disconnects the main bus-bar unit 112 in the main bus compartment 110 and the current transforming unit 150 in the load side compartment 130. When the circuit breaker unit 142 is inserted to the sealed circuit breaker compartment 140, the sliding terminals re-engage and circuit breaker unit 142 electrically connects a main bus-bar 112 in the main bus compartment 110 and the current transforming unit 150 in the load side compartment 130.

It will be appreciated that since the load side compartment 130 and the sealed circuit breaker compartment 140 are configured as separately independent compartments that do not share insulating gas, it is possible for the gas to be vented from the circuit breaker compartment 140 while leaving the gas within the load side compartment 130. As the transfer bus conductor 170 is located within that compartment, the components can continue to function in their normal manner even if the circuit breaker compartment is evacuated.

The first gas duct 190 and the second gas duct 192 respectively provide a path for emitting hot gas due to arc generated by operation of devices within the compartments 110, 120, 140 and 130 respectively. In one embodiment, the main bus compartment 110 and the transfer bus compartment 120 may be arranged side by side, and the sealed circuit breaker compartment 140 may be arranged in a bottom of the main bus compartment 110. Also, the first gas duct 190 is arranged between the main bus compartment 110 and the transfer bus compartment 120. Hot gas due to arcing generated within one of the main bus compartment 110, the transfer bus compartment 120 and the sealed circuit breaker compartment 140 may egress through the first gas duct 190. The relief of hot gas is controlled by pressure relieving gas outlets, such as burst discs, in the main bus compartment 110, the transfer bus compartment 120 and the sealed circuit breaker compartment 140, and each of the gas outlets is connected with the first gas duct 190.

The second gas duct 192 may be configured in a rear side of the load side compartment 130 and, in a similar manner; hot gas generated within the load side compartment 130 may be relieved through the second gas duct 192.

In operation in a normal current applying state, the circuit breaker unit 142 is inserted to the sealed circuit breaker compartment 140 and all compartments are filled with insulating gas. The switch unit 114a is conditioned so that current flows from the main bus-bar unit 112 to the cable terminal 160 through the circuit breaker unit 142, the switch unit 114a, the main bus-bar unit 180 and the current transforming unit 150.

If an abnormal condition arises, the circuit breaker unit 142 trips and disconnects the main bus from current transforming unit 150. The switch units 114a and 114c are opened and switch unit 114b closed to provide power through the transfer bus conductor 170. The circuit breaker compartment 140 may then be evacuated and opened. As shown in FIG. 2, the circuit breaker unit 142 may be withdrawn from the sealed circuit breaker compartment 140 in a direction of a front side of the GIS 100. In one embodiment, the circuit breaker unit 142 may be withdrawn from or inserted to the sealed circuit breaker compartment 140 in a sliding way. That is, the circuit breaker unit 142 may be inserted to the sealed circuit breaker compartment 140 to assemble the GIS 100 and withdrawn from the sealed circuit breaker compartment 140 to dissemble the GIS 100. During operations (i.e., withdrawal and insertion) of the circuit breaker unit 142, the GIS 100 maintains insulating gas filled with the load side compartment 130.

In one embodiment, when the circuit breaker unit 142 is withdrawn from the sealed circuit breaker compartment 140, a current may be applied from the transfer bus-bar unit 122 contained in the transfer bus compartment 120 to the current transforming unit 150 and the cable terminal 160 through the transfer conducting bus-bar 170.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A GIS (Gas Insulated Switchgear), the GIS comprising:
a main bus compartment including a main bus-bar unit, a transfer bus compartment including a transfer bus-bar unit, a sealed circuit breaker compartment including a circuit breaker unit and a load side compartment including a current transforming unit and a transfer bus conductor electrically coupling the transfer bus-bar unit and the current transformer unit,
wherein the circuit breaker unit is contained entirely in the sealed circuit breaker compartment, the sealed circuit breaker compartment being separately independent from the main bus compartment, the transfer bus compartment, and the load side compartment,
wherein the transfer bus conductor passes from the transfer bus-bar unit through the load side compartment to the current transformer unit without passing through the sealed circuit breaker compartment, and
wherein wherein the main bus compartment, the transfer bus compartment, the sealed circuit breaker compartment, and the load side compartment, are filled with an insulation gas, the insulation gas in the sealed circuit breaker compartment and the load side compartment are isolated from each other.

2. The GIS of claim 1 wherein the sealed circuit breaker compartment is located contiguous with the main bus compartment and the load side compartment is located contiguous with the transfer bus compartment.

3. The GIS of claim 1 wherein the sealed circuit breaker compartment is between a portion of the load side compartment and the main bus compartment.

4. The GIS of claim 1 wherein the main bus unit is connected to the circuit breaker unit by a conductor passing through an insulating bushing in a wall separating the main bus compartment and the sealed circuit breaker compartment.

5. The GIS of claim 1 wherein the circuit breaker unit is connected to a switch by a conductor passing through an insulating bushing in a wall separating the sealed circuit breaker compartment and the load side compartment, the switch being located in the load side compartment.

6. The GIS of claim 1 wherein the circuit breaker unit is slidable into or out of the sealed circuit breaker compartment.

7. The GIS of claim 1 wherein, when the circuit breaker unit is withdrawn, the GIS applies an electric current from the transfer bus-bar unit to the current transforming unit and a cable terminal.

8. The GIS of claim 1, further comprising:
a gas duct being between the main bus compartment and transfer bus compartment, the main bus compartment and the transfer bus compartment being arranged in parallel to each other,
wherein hot gas due to arc generated within one of the main bus compartment, the transfer bus compartment and the sealed circuit breaker compartment, egresses through the gas duct.

* * * * *